Dec. 14, 1965 A. BROTHMAN ET AL 3,223,995

DATA PROGRAMMER HAVING AN INTERLEAVED CODING ARRANGEMENT

Filed Dec. 28, 1962

INVENTORS
ABRAHAM BROTHMAN
STEPHEN J. HALPERN
RICHARD D. REISER
BY
OSTROLENK, FABER, GERB & SOFFEN
ATTORNEYS

1

3,223,995
DATA PROGRAMMER HAVING AN INTERLEAVED CODING ARRANGEMENT

Abraham Brothman, Dumont, N.J., Stephen J. Halpern, New York, N.Y., and Richard D. Reiser, Waldwick, N.J., assignors to Transitel International Corporation, Paramus, N.J., a corporation of New Jersey
Filed Dec. 28, 1962, Ser. No. 248,106
21 Claims. (Cl. 340—347)

This invention relates to communications systems and more particularly to a programming device for communications systems transmitting facilities which is adapted to key the transmitter output facility in a unique manner, in accordance with the encoded data to be transmitted and which is further adapted for use in applications which impose severe space and/or packaging limitations upon the transmitting facility.

Present day communications systems frequently employ coding schemes for the keying of the carrier frequency or frequencies in the transmission between receiver and transmitter locations. Such coding schemes are employed for the frequency, phase-shift or amplitude modulation of the carrier signals. One such communications scheme is comprised of transmitting coded information in parallel. This consists of providing a plurality of communication channels for carrier frequencies which are transmitted simultaneously from transmitter to receiver location. Due, however, to both cost and complexity considerations, and alternative scheme employed is that of serial transmission of data through a single communications channel, or carrier frequency. Thus the carrier frequency is keyed in accordance with a predetermined coding arrangement and is keyed in a serial fashion in accordance with the contents of each bit position of the coded information to be transmitted. Thus each sequential time slot is either phase-shift, frequency-shift, or amplitude modulated in accordance with the binary status of the binary bit being transmitted and each subsequent binary position is transmitted on one-at-a-time basis by the transmitter facility. It is thus necessary to provide a programming means for transferring all encoded data from a data source such as, for example, a metering instrument, a computer output, or any memory means such as punch paper taype, magnetic tape and so forth, and for sequentially impressing the encoded data from the data source upon the transmitter output facility in order that the keying function may be performed.

One transmitter facility employing such a programming means is set forth in U.S. application Serial Number 227,806 entitled Shaft Encoder Assembly, filed October 2, 1962, by Yanis et al., and assigned to the assignee of the instant invention. In the above mentioned copending application, a programming means is provided for sequentially impressing encoded characters in serial bit, serial character form, upon the transmitter output facility in order that the keying function may be performed under control of the coded character representations. The coded information in the above instance is taken from shaft angle encoder means of the type set forth in U.S. application Serial Number 125,247, entitled Code Stack Assembly, filed July 19, 1961, by a Brothman et al., and assigned to the assignee of the instant invention. Such encoding devices generate a binary coding arrangement representative of the shaft angle position occupied by the associated shafts. While the copending appliaction first

2 mentioned accepts its data from shaft angle encoders, it should be understood that any other data source may be employed in both the aforesaid copending application and the instant invention.

The binary status of each binary bit position is then transferred from the encoding devices to key the output transmitter device which in turn frequency-shifts, phase-shifts, or amplitude modulates the communications channel, which is transmitted to the remote receiver facility. Each shaft angle encoder is sequentially read until the entire message is transmitted. As can be seen in the first mentioned copending application, the programming means is housed within the confines of a utility meter and therefore has serever space limitations imposed upon it. It therefore becomes important in like applications where even greater space limitations are imposed upon the programming means to have the ability to provide a programming arrangement which performs the necessary sequencing functions and which occupies a minimum of space during operation thereof.

The device of the instant invention is so designed as to provide a unique arrangement for keying the transmitter output device and which successfully operates in severely limited space requirements since its physical size is substantially less than that of present day programming devices and specifically which is significantly smaller in size than the programming devices set forth in the first mentioned copending application.

The device of the instant invention is comprised of a rotating programming member having a unique coding configuration for impressing the binary information from the data source upon the transmitter output facility. The conductive configuration of the programming means rotating member, is adapted to generate a plurality of binary bit combinations for each character which are simultaneously impressed upon the transmitter output device as each coded character group is sensed by the programming means. This arrangement enables all of the binary bit positions of a single coded character (or shaft angle position) to be transmitted in less time than is required for the transmission of all the binary bit positions in a coded characted when they are transmitted on a one-at-a-time basis. This arrangement permits all of the coded characters (or shaft angle encoders) to be transmitted in significantly less time than such prior-art devices and which further enables the programming device to be designed to have significantly smaller physical dimensions.

The programming means is further designed so that the binary bit positions which are simultaneously impressed upon the transmitter output facility modulate the transmitter output facility in such a manner that the modulated frequencies are easily distinguishable from one another thereby simplifying the decoding operation for the receiver facility receiving such transmitted information.

It is therefore one object of the instant invention to provide programming means for a communications system transmitting facility which is so designed as to be readily adaptable to applications which impose severe packaging and/or limited space requirements for operations of the transmitter facility.

Another object of the instant invention is to provide a programming means for communications systems transmitter facilities which is adapted to key the transmitter output device in a novel manner.

Another object of this invention is to provide programming means for communication system transmitting facilities which is adapted to simultaneously impress a plurality of binary bit positions upon the transmitter output device for performance of the keying operation.

Still another object of this invention is to provide a programming means for transmitter facilities which is designed to impose the binary bit positions of a coded character in less time than is required for transmission of the binary bit positions on a one-at-a-time basis.

Another object of the instant invention is to provide a programming means for a transmitter output facility which is so designed as to modulate the transmitter output facility wherein the frequencies representative of the coded characters are readily distinguishable from one another so as to simplify the receiver facility decoding function. These and other objects of the instant invention will become apparent when reading the accompanying description and drawings in which.

Figure 2:
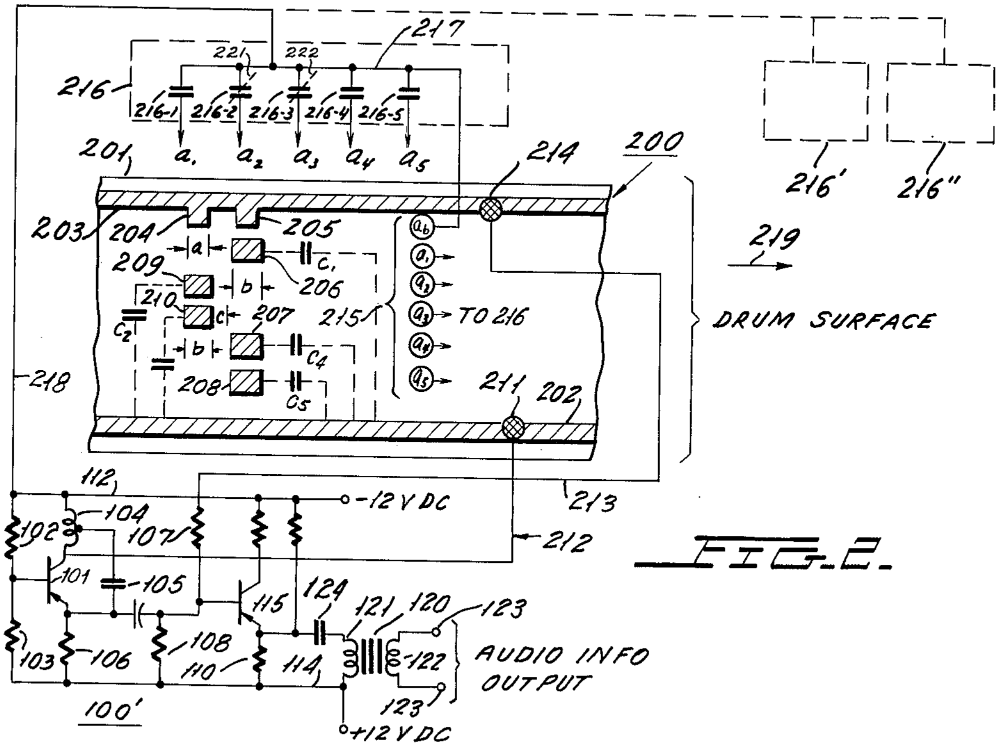
FIGURE 2 is a diagram partially in schematic form of a modified transmitter device and showing a sectionalized view of a programming means cooperating therewith and which is designed in accordance with the principles of the instant invention.
Figure 3A:
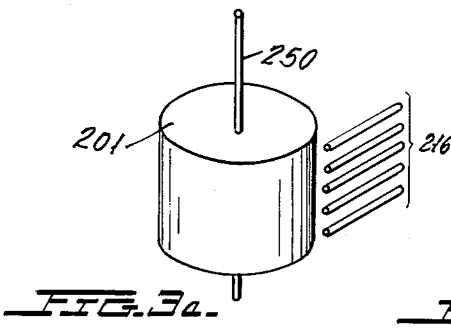

FIGURE 3*a* is a perspective view of the programming means shown in FIGURE 2.

Figure 3B:
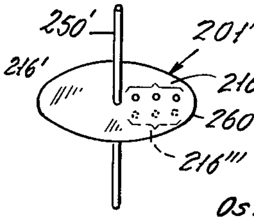

FIGURE 3*b* is a perspective view of an alternative programming means to that shown in FIGURES 2 and 3*a*.

Figure 1:
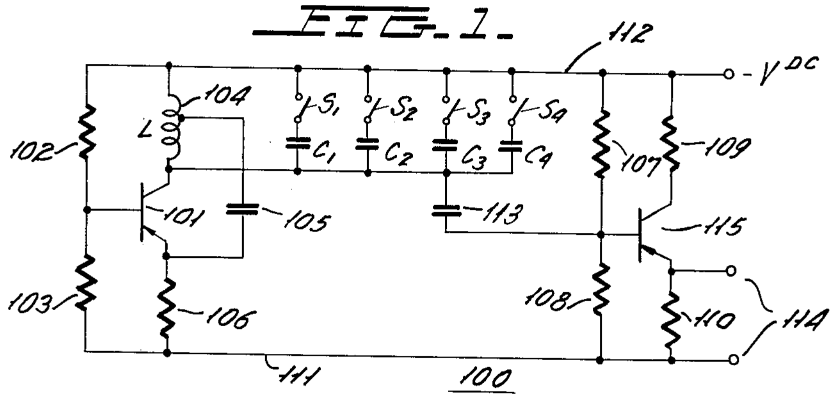
FIGURE 1 is a schematic diagram of one transmitter output device.

Referring now to the drawings; FIGURE 1 shows a transmitter output device 100 comprised of a transistor 101 connected to a reference bus 111 and a constant voltage bus 112, by means of resistor 106 and inductor 104 respectively. A voltage divider circuit comprised of resistors 102 and 103 having their common terminal connected to the base electrode of transistor 101 operates to bias transistor 101 into conduction. Capacitor 105 is connected between the emitter electrode of transistor 101 and a point intermediate the ends of inductor 104 causing transistor 101 to oscillate at a predetermined frequency when a capacitor is switched in. The collector electrode or output terminal of transistor 101 is A.C. connected to the base electrode of transistor 115 by means of capacitor 113. Resistors 107 and 108 form a voltage divider circuit having its common terminal connected to the base electrode of transistor 115 for the purpose of biasing this transistor into conduction. Emitter and collector electrodes of transistor 115 are connected to the reference and constant voltage D.C. busses 111 and 112 respectively, by means of resistors 110 and 109 respectively. The output signal of the transmitter device 100 is taken across the terminals 114 of resistor 110. The constant voltage bus 112 is connected to a voltage source —V selected to appropriately bias the transistors 101 and 115. Thus with the suitable voltage levels being applied to the circuit 100 a constant frequency signal is generated at the collector terminal of transistor 101 which in turn is impressed upon the base electrode of transistor 115. Transistor 115 acts as an emitter follower circuit so as to provide suitable impedance the matching between the oscillating portion of circuit 100 and the utilizations means (not shown) connected between output terminals 114 of circuit 100.

A plurality of capacitors $C_1$–$C_4$ are provided for altering the operating frequency at which the circuit 100 functions. Each capacitor is connected in series with an associated switch means $S_1$–$S_4$ respectively. Each such series combination is connected in parallel across the terminals of inductor 104. Thus by operating the switches $S_1$–$S_4$ in a predetermined manner the operating frequency of the circuit 100 may be modified so as to represent predetermined decimal characters (or angular positions of a shaft such as set forth in the above mentioned U.S. application Serial No. 227,806).

One scheme for representing decimal characters in binary fashion is the binary coded decimal scheme shown in Table No. 1 below:

*Table No. 1*

| Dec. No. | $S_4$ 8 | $S_3$ 4 | $S_2$ 2 | $S_1$ 1 |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |

As can be seen from Table No. 1, four binary bit positions 8, 4, 2 and 1 respectively, are employed for the purpose of representing the decimal characters 0–9. For example, the decimal number 5 is represented in binary coded decimal by the arrangement 0101. Decimal number 9 is represented by 1001 and so forth, relating each binary bit position to the switches $S_1$–$S_4$ as shown in Table 1. The closure of the aforementioned switches "S" in the arrangement shown in Table No. 1 may be employed for the purpose of generating ten specific frequencies, each related respectively to one of the decimal characters 0–9. For example, if it is desired to generate the frequency representative of the decimal number 3, switches $S_1$ and $S_2$ are moved to their closed condition, while switches $S_3$ and $S_4$ are kept in the open position.

In order to compute the magnitudes of the operating frequencies employed in the above scheme, let the inductor 104 be represented by the letter L. Thus the frequencies $f_1$–$f_4$ generated through closure of the switches $S_1$–$S_4$ respectively, on a one-at-a-time basis, may be calculated from the following equations:

$$f_1=\frac{1}{2n\sqrt{LC_1}}$$

$$f_2=\left[\frac{C_1}{C_2}\right]^{1/2}f_1$$

$$f_3=\left[\frac{C_1}{C_3}\right]^{1/2}f_1$$

$$f_4=\left[\frac{C_1}{C_4}\right]^{1/2}f_1$$

$$\frac{f_1}{f_2}=\frac{2n\sqrt{LC_1}}{2n\sqrt{LC_1}}$$

As can be seen from the chart of Table No. 1, the largest number of switch closures required is that for representation of the decimal number 7 which requires that switches $S_1$, $S_2$ and $S_3$ be closed while $S_4$ remain open. The frequency $f_{123}$ developed by the circuit 100 for transmission of decimal number 7 may be derived from the following equation:

$$f_{123}=\left[\frac{C}{C_1+C_2+C_3}\right]^{1/2}f_1$$

for decimal 7.

It can be seen from the above that the lowest necessary tone frequency is that generated during the transmission of a decimal number 7. The remaining binary coded decimal frequencies which will be necessary for the representation of all the decimal characters 0–9 are:

$$f_{12}=\left[\frac{C_1}{C_1+C_2}\right]^{1/2}\pi$$

$$f_{13}=\left[\frac{C_1}{C_1+C_3}\right]^{1/2}f_1$$

$$f_{23}=\left[\frac{C_1}{C_2+C_3}\right]^{1/2}\pi$$

$$f_{14}=\left[\frac{C_1}{C_1+C_4}\right]^{1/2}\pi$$

$$f_{24}=\left[\frac{C_1}{C_2+C_4}\right]^{1/2}\pi$$

$$f_{123}=\left[\frac{C_1}{C_1+C_2+C_3}\right]^{1/2}f_1$$

$$\frac{f_{12}^2}{f_{123}^2}=\frac{C_1+C_2+C_3}{C_1+C_2}$$

and $$f_{12}-f_{123}=\Delta f_1$$

$$\frac{f_{123}^2+2f_{123}\Delta f_1+\Delta f_1^2}{f_{122}^2}=1+\frac{C_3}{C_1+C_2}$$

$$\frac{2\Delta f_1}{f_{123}}+\frac{\Delta f_1^2}{f_{123}^2}=\frac{C_3}{C_1+C_2}=m_1$$

nextly let $$\frac{f_{12}^2}{f_{23}^2}=\frac{C_2+C_3}{C_1+C_2}=m_2$$

and then $$\frac{\frac{C_3}{C_1+C_2}}{\frac{C_2+C_3}{C_1+C_2}}=\frac{m_1}{m_2}=\frac{C_3}{C_2+C_3}$$

$$m_1C_2+m_1C_3=m_2C_3$$

$$m_1C_2=(m_2-m_1)C_3$$

requiring, of course, that $$m_2>m_1$$

Further, since $$C_2=\frac{m_2-m_1}{m_1}C_3$$

and $$m_1=\frac{C_3}{C_1+C_2}=\frac{C_3}{C_1+\frac{m_2-m_1}{m_1}C_3}$$

$$C_1=\frac{1-(m_2-m_1)}{m_1}C_3$$

which requires of course, that $$(m_2-m_1)<1$$

If, now, $$\frac{f_{14}^2}{f_{12}^2}=\frac{C_1+C_2}{C_1+C_4}=m_3$$

$$C_1+C_2=m_3(C_1+C_4)$$

$$\frac{\frac{C_3}{C_1+C_2}}{\frac{C_1+C_4}{C_1+C_2}}=m_1m_3=\frac{C_3}{C_1+C_4}$$

$$m_1m_3\left\{\left[\frac{1-(m_2-m_1)}{m_1}\right]C_3+C_4\right\}=C_3$$

$$C_4=\frac{C_3}{m_1m_3}-\frac{1-(m_2-m_1)}{m_1}C_3$$

$$C_4=\frac{C_3}{m^1}\left[\frac{1}{m_3}-\{1-(m_2-m_1)\}\right]$$

$$f_{12}=m_2^{1/2}f_{23}$$

$$\Delta f_2=f_{12}-\frac{f_{12}}{m_2^{1/2}}=f_{12}\left[1-\frac{1}{m_2^{1/2}}\right]$$

$$f_{14}=m_3^{1/2}f_{12}$$

$$\Delta f_3=f_{12}-f_{14}=f_{12}[1-m_3^{1/2}]$$

From the above development it can be seen that the inter-relationships between the frequencies $f_{12}$, $f_{23}$, $f_{123}$ and $f_1$ make good separation between the above generated frequencies extremely difficult. Thus the composite frequencies formed being so close to one another make the identification of each such frequency an exceedingly difficult task for the communications system receiving facility.

In persuing a more advantageous approach, we refer to the coding scheme as set forth in Table No. 2 below:

*Table No. 2*

| | 1 | 2 | 4 | 7 | P |
|---|---|---|---|---|---|
| 1 | 1 | 0 | 0 | 0 | 1 |
| 2 | 0 | 1 | 0 | 0 | 1 |
| 3 | 1 | 1 | 0 | 0 | 0 |
| 4 | 0 | 0 | 1 | 0 | 1 |
| 5 | 1 | 0 | 1 | 0 | 0 |
| 6 | 0 | 1 | 1 | 0 | 0 |
| 7 | 0 | 0 | 0 | 1 | 1 |
| 8 | 1 | 0 | 0 | 1 | 0 |
| 9 | 0 | 1 | 0 | 1 | 0 |
| 0 | 0 | 0 | 1 | 1 | 0 |

The coding scheme of Table No. 2 is another binary scheme for representing in binary form the decimal characters 0–9. The coding scheme of Table No. 2 is comprised of four data bits plus a parity bit whose function it is to generate a coded character having even parity. This is performed by examining the bit positions of the data bits and algebraically adding them to see if there are an odd or an even number of such bits. If the number of binary one data bits in the coded character is odd then the parity bit position is made binary one in order to establish even parity. If the number of binary ones in the data bit positions is even, the parity bit position remains binary zero since even parity is established without the parity bit. Thus, for example, decimal 6 is represented in the coding scheme of Table 2 by a binary one in the two position and a binary one in the four position while the one position and seven position are binary zero. This establishes a decimal representation for the numeric character 6. For parity it is noted that the number of binary one data bits are two so that a binary zero in the parity bit or P position is a binary zero in order to maintain even parity. Thus the decimal number 6 is represented by the coding scheme of Table 2 as 01100. The remaining decimal characters are formed in a similar manner. Observation of the coding arrangement of Table No. 2 shows that in no case does the binary representation for any decimal character contain fewer than or greater than two binary ones in the code group. The code thereby has an inherent self-checking feature such that upon its receipt at the receiving facility, if the code group for any decimal character contains greater than or less than two binary ones in its make up, this can immediately be interpreted as an error so that remedial steps may then be taken by the receiving facility.

In attempting to develop a programming means, it is significant to note that the results obtained in consideration of a circuit 100 of FIGURE 1, show that the imposition of three binary bit positions simultaneously upon the transmitter output facility 100 complicates frequency separation requirements so that it becomes important to limit the number of binary bit positions which are transmitted simultaneously to the oscillating circuit of the output facility 100 of FIGURE 1. The transmitter output facility employed for this coding arrangement is labeled 100′ as shown in FIGURE 2, in which like elements to the circuit 100 of FIGURE 1 carry like numerals. The transmitter facility 100′ of FIGURE 2, further shows the employment of a transformer means 120 whose primary winding 121 is connected in series with capacitor member 124, the series connected elements being connected across the terminals 114 of resistance 110 in the emitter circuit of transistor 115. The secondary winding 122 has its terminals 123 available for connection to an output utilization device (not shown) such as, for example, telephone lines, power lines, radio antennas, and so forth. Transformer 120 provides D.C. isolation between the transmitter circuit 100′ and the output utilization device connected to the output terminals 123.

Since the code scheme of Table No. 2 contains five binary bit positions, it becomes necessary in our transmitter facility to provide five capacitive members $C_1$–$C_5$, shown in the programming means 200, which cooperates with the output facility 100′ of FIGURE 2. The programming means 200 is comprised of a rotating member or drum 201 which has been shown sectionalized for purposes of clarity. The cylindrical surface of rotating member 201 has a first continuous conductive strip 202 surrounding the entire periphery of drum 200. A sensing brush 211 is positioned so as to make continuous wiping contact with the conductive strip 202. This sensing brush is electrically connected by means of conductor 212 to the collector electrode of transistor 101. A second continuous conductive strip 203 is provided on the periphery of drum 201 and cooperates with a sensing brush 214 which is positioned to make wiping contact with strip 203 and which is connected through conductor 213 to resistor 107. Conductive strip 203 is provided with two vertically aligned projecting segments 204 and 205 for performance of the transmitter circuit keying operation in a manner to be more fully described.

Two vertically aligned groups of conductive segments are provided on the surface of drum 201. The first group is comprised of segments 206, 207 and 208. Positioned immediately behind the first group by a distance *c* is a second group of vertically aligned conductive segments 209 and 210. Each of the conductive segments 206–210 are electrically connected to the continuous conductive strip 202 by means of associated capacitor members $C_1$, $C_4$, $C_5$, $C_2$ and $C_3$ respectively. The capacitor groups are shown as being electrically connected by means of the dotted lines of FIGURE 2. Since sensing brush 211 continuously sweeps conductor strip 202 and since one terminal of each capacitor $C_1$–$C_5$ is electrically connected to strip 202, then these terminals of capacitor $C_1$–$C_5$ are permanently electrically connected to the collector electrode terminal of transistor 101. This still, however, leaves the opposite terminals of each of the capacitors $C_1$–$C_5$ virtually unconnected to the circuit 100′. These connections are established in accordance with the coding arrangements set forth in Table No. 2 above.

One such means for establishing the connections in accordance with the code combinations of Table No. 2, resides in the employment of a shaft angle encoder shown schematically by block 216, in FIGURE 2. Shaft angle encoders are described in greater detail in the aforementioned U.S. application Serial Number 125,247 and a detailed discussion will be omitted herein for purposes of clarity. Suffice it, however, to say, that such shaft angle encoders provide a predetermined binary code arrangement in accordance with discrete angular positions of the rotating shaft. Such rotating shafts are employed in watthour meters wherein the shafts are provided with pointers at one end thereof which cooperate with dial faces to provide a visually observable reading to determine what amount of watthours or other measurable quantity has been used by the subscriber to the utility company system. The shaft angle encoders are not limited in their usage to watthour or other utility meters, but may further be employed in any such recording instruments, such as, for example, cyclometers, gear trains, dials and the like, which may be employed in reading of liquid levels or the counting of the number of hours of operation of a television set in a pay TV system for example. The shaft angle encoder 216 provides a binary output which contains 5 binary bit positions $a_1$–$a_6$ wherein two of the 5 bit positions, never more, never less, contain binary ones, in accordance with the coding arrangement of Table No. 2 discussed previously. The code combination is represented schematically in FIGURE 2 by the contact pairs 216–1 through 216–5 such that a contact pair which is closed represents a binary one state while the contact pair which is open represents a binary zero state. Each of the contact pairs 216–1 through 216–5 is operable and movable into both the open and closed conditions thus enabling their appropriate setting to any one of the ten code combinations as shown in FIGURE 2. The upper terminals of each contact pair are connected in common to a common bus means 217 which is electrically connected through conductor 218 to the constant D.C. bus 112. The opposite terminals $a_1$–$a_5$ of the switch pairs 216–1 through 216–5 respectively, are directly and electrically connected to the sensing brushes $a_1$–$a_5$ respectively, of the sensing brush group 215. The sensing brushes $a_1$–$a_5$ of the brush group 215 are so positioned as to make sliding contact with the conductive segments 206, 209, 210, 207 and 208 respectively. Sensing brush $a_6$ makes wiping contact with the vertical segments 205 and 204 in sequence during the operation of the programmer means for the purpose that the sensing brushes 211, 214 and the sensing brush group 215 remain stationary with the programming drum 201 moving from the left to the right in the direction shown by arrow 219.

The operation of the programmer 200 is as follows:

Let it first be assumed that shaft angle encoder 216 is in a position whereby a decimal number 6 is to be transmitted by the transmitter facility 100′. In this case, contact pairs 216–2 and 216–3 are in the closed position as shown by the dashed lines 221 and 222 respectively, while contact pairs 216–1, 216–4 and 216–5 are in the open position. As drum 201 moves in the direction shown by arrow 219, conductive segments 206, 207 and 208 move beneath the sensing brushes $a_1$, $a_4$ and $a_5$ of the sensing brush group 215. Since contact pairs 216–1, 216–4 and 216–5 are in their open state in this position, capacitors $c_1$, $c_4$ and $c_5$ play no part in the instantaneous condition of transmitter output circuit 100′. An instant after sensing brushes $a_1$, $a_4$ and $a_5$ of the brush group 215 make wiping contact with the segments 206, 207 and 208, sensing brush $a_6$ of brush group 215 makes sliding engagement with projecting segment 205. This occurs an instant later than the wiping contact made between brushes $a_1$, $a_4$ and $a_5$ with segments 206, 207 and 208 respectively, due to the fact that the right-hand edge of segment 205 is positioned somewhat beyond the right-hand edges of segments 206–208. When this occurs a conductive path exists from base electrode of transistor 115 through resistor 107, conductor 213, sensing brush 214, conductive strip 203, segment 205, sensing brush $a_6$ of brush group 215 common bus 217 and conductor 218 to the constant D.C. bus 112. This imposes a negative potential upon the base of transistor 115 keying transistor 115 into conduction so that the frequency signal generated by the oscillation portion of the circuit is passed through transistor 115 and transformer 120 to the output terminals 123 of circuit 100′. The oscillating frequency is in no way controlled by capacitors $c_1$, $c_4$ and $c_5$ since the contact pairs with which they are associated are open at this time.

At a predetermined time period after wiping contact was made with conductive segments 206–208, sensing brushes 215 move to a position away from segments 206–

208 and into wiping contact with segments 209 and 210 such that sensing brushes $a_2$ and $a_3$ make the wiping contact with segments 209–210. In this position a first conductive path exists from the collector electrode of transistor 101 through conductor 212, sensing brush 211, conductive strip 202, capacitor $c_2$, segment 209, sensing brush $a_2$ of brush group 215, contact pair 216–2 (which is now in the closed position), common bus 217 and conductor 218 to constant D.C. bus 112. This places capacitor $c_2$ directly in parallel with conductor 104 thereby modifying the operating frequency of the oscillator circuit. A second parallel path exists simultaneously therewith and extends from conductive strip 202 through capacitor $C_3$, segment 210, brush $a_3$ of group 215, closed contact pair 216–3, common bus 217 and conductor 218 to constant D.C. bus 112. Thus, both capacitors $C_2$ and $C_3$ being in direct shunt with inductor 104 impose an oscillating frequency on the circuitry 100′ different from that imposed by inductor 104 and capacitor 105 alone. Immediately after wiping contact is made with segments 209 and 210 by brushes $a_2$ and $a_3$ of brush group 215, brush $a_6$ of brush group 215 makes wiping contact with segment 204 whose right-hand edge is positioned somewhat beyond the right-hand edges of segments 209 and 210. This establishes a conductive path from the base electrode of transistor 115 through resistor 107, conductor 213, brush 214, conductive strip 203, vertical segment 204, brush $a_6$ of brush group 215, common bus 217 and conductor 218 to constant D.C. bus 112. This condition again keys transistor 115 into conduction thus enabling the frequency generated due to the circuit of capacitor $C_2$ and $C_3$ to the passed by transistor 115 through transformer 120 to the output terminals 123 thereof.

It can be seen from the above that during the first transmission cycle capacitor $C_1$, $C_4$ and $C_5$ play no part in determining the operating frequency and thus no tone of the circuit 100′ while during the second keying cycle capacitors $C_2$ and $C_3$ are connected in shunt with inductor 104 so as to determine the operating frequency. While the coded representation contains five binary data bits and one binary parity bit, the additional transmission cycle has been carried out at the scheme of FIGURE 2 utilizing only two serially arranged transmission intervals. Thus the receiving facility interprets the frequency of the signals received in both the first and the second intervals in order to identify the character which has been transmitted.

While the above description has been set forth for the transmission of a single coded decimal character, it should be understood that a larger number of such decimal characters may be transmitted by the transmitter facility as shown by the dashed representation of additional shaft angle encoders 216′ and 216″. It should be understood that each additional shaft angle encoder is provided with an associated group of sensing brushes substantially identical to the sensing brush group 215 in order that each sensing brush group for each coded character to be transmitted may be swept in turn by the segments 206–210 of the programming means 200.

A suitable transmitting circuit having been achieved, it now becomes necessary to provide such a transmitting facility which is capable of generating the necessary frequency signals such that adequate separation between and amongst the signals generated is maintained throughout the operation of the transmitter facility regardless of the coded character which it is desired to transmit. In order to determine these operating frequencies and their frequency separations, let it first be assumed that the frequencies $f_1$–$f_5$ be represented by the following equations (which hold true when only one of the five contact pairs 216–1 through 216–5 are in the closed position at any given instant).

$$f_1=\frac{1}{2n\sqrt{LC_1}}$$

$$f_2=\frac{1}{2n\sqrt{LC_2}}$$

$$f_3=\frac{1}{2n\sqrt{LC_3}}$$

$$f_4=\frac{1}{2n\sqrt{LC_4}}$$

$$f_5=\frac{1}{2n\sqrt{LC_5}}$$

Let it further be assumed that the relationship between and among the frequencies $f_1$–$f_5$ be the following:

$$f_1>f_2>f_3>f_4>f_5$$

In accordance with the above relationships between and among the frequencies, the operating frequencies $f_1$–$f_5$ will be chosen, for example, in accordance with the following:

$f_1$=2500 v./s.
$f_2$=2000 v./s.
$f_3$=1500 v./s.
$f_4$=1000 v./s.
$f_5$=800 v./s.

These operating frequencies have been selected in order to provide adequate frequency spacing therebetween for identification purposes. It should be understood that any other frequency selections may be readily employed. Also, it should be noted that the frequencies $f_1$–$f_5$ selected as above lie within the bandpass of typical phone lines range thereby making their use readily adaptable for imposition upon a telephone company network such that these frequencies lie well within the permissible audio band width which may be successfully passed through the telephone company network without undergoing substantial attenuation thereof.

In accordance with the above selected frequency values and in conformity with the coding scheme set forth in Table No. 2 the subscripts of each frequency equation will be employed to represent a closed condition for the particular contact pair in accordance with the decimal character being encoded. The following equations therefore hold true:

Decimal "1"—$f_{15}=\frac{1}{2n\sqrt{L(C_1+C_5)}}$

Decimal "2"—$f_{25}=\frac{1}{2n\sqrt{L(C_2+C_5)}}$

Decimal "3"—$f_{12}=\frac{1}{2n\sqrt{L(C_1+C_2)}}$

Decimal "4"—$f_{35}=\frac{1}{2n\sqrt{L(C_3+C_5)}}$

Decimal "5"—$f_{13}=\frac{1}{2n\sqrt{L(C_1+C_3)}}$

Decimal "6"—$f_{23}=\frac{1}{2n\sqrt{L(C_2+C_3)}}$

Decimal "7"—$f_{45}=\frac{1}{2n\sqrt{L(C_4+C_5)}}$

Decimal "8"—$f_{14}=\frac{1}{2n\sqrt{L(C_1+C_4)}}$

Decimal "9"—$f_{24}=\frac{1}{2n\sqrt{L(C_2+C_4)}}$

Decimal "0"—$f_{34}=\frac{1}{2n\sqrt{L(C_3+C_4)}}$

Thus, for example, in order to represent the decimal number 5 and referring to Table No. 2, a binary one condition must be present in positions number 1 and number 3 of the data bit positions of Table 2. This is represented immediately above by the symbol $f_{13}$ where the subscript 1 refers to a closed condition in the binary bit position number 1 and the subscript 3 symbolizes a closed condition in the binary bit position number 3. As can be seen, the frequency $f_{13}$ generated at this time is equal to the equation as set forth immediately above which shows that capacitors $C_1$ and $C_3$ effect the operating frequency of the transmitter circuit 100' of FIGURE 2.

The relationships between the frequencies $f_1$, $f_3$ and $f_{12}$ are therefore given by the following equations:

$$\frac{f_1^2}{f_2^2}=\frac{C_2}{C_1}=m_1$$

$$\frac{f_1^2}{f_{12}^2}=\frac{C_1+C_2}{C_1}=1+m_1$$

$$\frac{f_1}{f_{12}}=\sqrt{1+m_1}$$

Utilizing the equations set forth immediately above leads us to the development of Table No. 3 set forth below:

*Table No. 3*

| Decimal No. | | $n$ | $\sqrt{1+m_{xy}}$ | $\frac{f_x}{\sqrt{1+n_{xy}}}$ |
|---|---|---|---|---|
| 1 | $f_{15}=$ | $\left(\frac{25}{8}\right)^2=9.7$ | $\sqrt{10.7}=3.28$ | 762 |
| 2 | $f_{25}=$ | $\left(\frac{20}{8}\right)^2=6.25$ | $\sqrt{7.25}=2.68$ | 747 |
| 3 | $f_{12}=$ | $\left(\frac{25}{20}\right)^2=1.56$ | $\sqrt{2.56}=1.6$ | 1,560 |
| 4 | $f_{35}=$ | $\left(\frac{15}{8}\right)^2=3.5$ | $\sqrt{4.5}=2.12$ | 705 |
| 5 | $f_{13}=$ | $\left(\frac{25}{15}\right)^2=2.76$ | $\sqrt{3.76}=1.945$ | 1,290 |
| 6 | $f_{23}=$ | $\left(\frac{20}{15}\right)^2=1.77$ | $\sqrt{2.77}=1.67$ | 1,200 |
| 7 | $f_{45}=$ | $\left(\frac{10}{8}\right)^2=1.56$ | $\sqrt{2.56}=1.6$ | 625 |
| 8 | $f_{14}=$ | $\left(\frac{25}{10}\right)^2=6.25$ | $\sqrt{7.25}=2.68$ | 935 |
| 9 | $f_{27}=$ | $\left(\frac{20}{10}\right)^2=4$ | $\sqrt{5}=2.24$ | 893 |
| 0 | $f_{34}=$ | $\left(\frac{15}{10}\right)^2=2.25$ | $\sqrt{3.25}=1.81$ | 830 |

Thus, in accordance with the selected frequencies set forth previously, the frequency combinations for the decimal representations 0–9 are given in Table No. 3 where if, for example, decimal number 7, which is representable by the symbol $f_{45}$ denotes that capacitors 4 and 5 are simultaneously connected in parallel with inductor 104 so as to generate a frequency of 625 cps. It can be seen from the developed frequencies set forth in Table No. 3 that certain generated frequencies are extremely close to other frequencies generated by the circuit 100' and it becomes a significant factor to determine which programming arrangement may be best used so as to provide the largest frequency separation between the various frequencies which may be generated during the course of the transmission cycle. As one example, the frequency generated for representing the decimal number 1 is 762 c.p.s. while the frequency for decimal number 2 is 747 c.p.s., a difference of only 17 c.p.s., the frequencies for the decimal numbers 8 and 9 which are only 42 c.p.s. apart. In order to provide adequate frequency separation the segments 260–210 in the programming means 200 are aligned in two distinct vertical positions such that certain of these segments are positioned in one vertical array and the remaining ones of these segments are positioned in the second vertical array.

One such arrangement is shown in Table No. 4 below:

*Table No. 4*

| | B | A | C |
|---|---|---|---|
| 1 | | 206 | O→ |
| 2 | 207 | | O→ |
| 3 | | 210 | O→ |
| 4 | 209 | | O→ |
| 5 | 208 | | O→ |

| | 1st Tone, c.p.s. | 2nd Tone, c.p.s. |
|---|---|---|
| 1 | 2500 | 800 |
| 2 | None | 747 |
| 3 | 2500 | 2000 |
| 4 | 1500 | 800 |
| 5 | 1290 | None |
| 6 | 1500 | 2000 |
| 7 | None | 625 |
| 8 | 2500 | 1000 |
| 9 | None | 893 |
| 0 | 1500 | 1000 |

From this arrangement it can be seen that segments 206 and 210 are positioned in vertical array A and segments 207, 209 and 208 are positioned in vertical array B. These vertical arrays cooperate with the sensing brush vertical array C such that vertical array A comes beneath the sensing brushes of vertical array C prior to the vertical array B. The rectangular blocks shown in vertical arrays A and B which contain the numbers 206–210, respectively, should be considered as being conductive blocks which make wiping engagement with the associated circles shown in vertical array C, which circles represent the sensing brushes. The unnumbered rectangular blocks appearing in vertical arrays A and B should be considered as being formed of insulating material. Similar conductive rectangular shaped blocks are shown in FIGURE 2 of the instant application and are also numbered 206–210, respectively. The circles appearing in vertical array C are substantially similar to the circles designated $a_1$ through $a_5$, respectively, also shown in FIGURE 2. The arrows leading away from the circles in vertical array C represent the connection leading from the sensing fingers to the capacitor elements 216–1—216–5, respectively, shown in FIGURE 2. The above representations also hold for Tables 5–7, respectively, which are discussed subsequently in this application. Thus considering this arrangement shown in Table No. 4, the left-hand column of Table No. 4 shows the frequencies which are generated for the decimal numbers 0–9 in first the vertical array A which is the first tone generated and next the vertical array B which is the second tone generated. One example that may be considered is the transmission of a decimal number 6. As can be seen from Table No. 2, this requires binary ones in the second and third positions. Thus capacitors $C_2$ and $C_3$ are introduced into the oscillating circuit by means of the conductive segments 206–210. For decimal number 6 it can be seen that the capacitor $C_3$ is the only capacitor connected into the oscillating circuit during the time at which the first tone is generated. Thus a first tone of 1500 c.p.s. is generated at the first keying interval. The second keying interval contains the segment 207 which is connected to capacitor $C_2$ so as to generate a tone of 2000 c.p.s. during the second keying interval. Thus the receiver facility identifies the receipt of first a 1500 c.p.s. and next a 2000 c.p.s. signal as representative of the transmission of a decimal number 6. As another example, let it be assumed a decimal number 7 is to be transmitted. Considering Table No. 2, this requires a binary one state in the fourth and fifth binary bit positions. As can be seen from Table No. 4 capacitors $C_4$ and $C_5$ are connected to the conductive segments 209 and 208 respectively, which both are aligned in the B interval. This means that during the first keying interval A none of the capacitors $C_1$–$C_5$ are connected into the tuned circuit. However, during the second keying interval B both capacitors $C_4$ and $C_5$ are connected into the tuned circuit causing the generation of a signal of a frequency of 625 c.p.s. It can be seen from the consideration of Table No. 4 that while three decimal characters, namely, decimal characters 1, 3 and 8 generate a 2500 c.p.s. tone during the first keying interval they are readily distinguishable from one another because during the second keying interval they generate 800 c.p.s., 2000 c.p.s. and 1500 c.p.s. tones which are readily distinguishable from one another so as to substantially simplify the interpreting function of the receiving facility. The only frequencies generated which are relatively close to one another are those for decimal numbers 2, 7 and 9 wherein a frequency difference of 122 c.p.s. separates the frequency for decimal number 2 from the frequency of decimal number 7 and a frequency spread of 146 c.p.s. separates decimal number 2 from decimal number 9. As can be seen these frequency spreads are quite substantial since even the frequency selections made for $F_1$–$F_5$ given previously, only 200 cycles per second separates frequency $F_4$ from $F_5$ and the frequency spreads mentioned above are approximately 75% as great as the 200 c.p.s. frequency spread.

An alternative arrangement is shown in Table No. 5 wherein segments 206 and 209 are aligned in keying interval A and segments 207, 210 and 208 are aligned in keying interval B.

*Table No. 5*

| B | A | C |
|---|---|---|
| | 206 | O→ |
| 207 | | O→ |
| 210 | | O→ |
| | 209 | O→ |
| 208 | | O→ |

| | | Decimal No. |
|---|---|---|
| 2500— | —→ 800— | 1 |
| 747— | | 2 |
| 2500— | —→2000— | 3 |
| 705— | | 4 |
| 2500— | —→1500— | 5 |
| 1200— | | 6 |
| 1000— | —→ 800— | 7 |
| 935— | —→ 0 | 8 |
| 1000— | —→2000— | 9 |
| 1000— | —→1500— | 0 |

Considering Table No. 5, it can be seen that the frequencies generated for decimal number 2 and decimal number 4 are such that during keying interval A none of the capacitors $C_1$–$C_5$ alter the operating frequency of the oscillation circuit while during the keying interval B a 747 c.p.s. tone and a 705 c.p.s. tone is generated for the decimal numbers 2 and 4 respectively. This represents a separation of 42 c.p.s. making this arrangement a less advantageous choice than the arrangement given in Table 4 discussed above.

Two additional arrangements are given in Tables 6 and 7 set forth below:

*Table No. 6*

| B | B | C |
|---|---|---|
| | 1 | O→ |
| 2 | | O→ |
| 3 | | O→ |
| 4 | | O→ |
| | P | O→ |

| | | Decimal No. |
|---|---|---|
| 762—→ | 0 | 1 |
| 800—→ | 2000 | 2 |
| 2500—→ | 2000 | 3 |
| 800—→ | 1500 | 4 |
| 2500—→ | 1500 | 5 |
| 0—→ | 1200 | 6 |
| 800—→ | 1000 | 7 |
| 2500—→ | 1000 | 8 |
| 0—→ | 893 | 9 |
| 0—→ | 830 | 0 |

*Table No. 7*

| B | A | C |
|---|---|---|
| | 1 | O→ |
| 2 | | O→ |
| 3 | | O→ |
| | 4 | O→ |
| | 5 | O→ |

| 2nd Tone Received | 1st Tone Received | Decimal No. |
|---|---|---|
| 0 | 762 | 1 |
| 2000 | 800 | 2 |
| 2000 | 2500 | 3 |
| 1500 | 800 | 4 |
| 1500 | 2500 | 5 |
| 1200 | 0 | 6 |
| 0 | 625 | 7 |
| 0 | 935 | 8 |
| 2000 | 1000 | 9 |
| 1500 | 1000 | 0 |

As can be seen from Table No. 6 the most troublesome generated frequencies are those for the decimal numbers 9 and 0 which generate frequencies of 893 c.p.s. and 830 c.p.s. giving a spread of 63 c.p.s. therebetween. That makes the selection of the arrangement of Table No. 6 slightly advantageous over the arrangement of Table No. 5, but not quite as advantageous as the arrangemeans of Table No. 4.

The arrangement of Table No. 7 provides the smallest frequency spread between decimal number 1 and decimal number 7 which is a spread of 137 c.p.s. and between decimal number 1 and decimal number 8 which is a spread of 173 c.p.s. As these spreads are quite substantial, the most advantageous groupings therefore are the groupings given in Tables 4 and 7 in that order of priority.

FIGURE 3*a* shows a perspective view of the programming means of FIGURE 2 which is shown as a drum member 201 having the conductive segments wherein like conductive segments bear like numeric designations to that of FIGURE 2. The program drum 201 of FIGURE 3*a* is journalled to a shaft 250 for rotation thereof whereby the initiation of rotation of shaft 250 is controlled by the suitable motor drive means in the manner similar to that set forth in copending U.S. application Serial Number 227,806 set forth previously. A second arrangement for programmer 201 is shown by the embodiment 201′ of FIGURE 3*b* which employs a similar coating configuration which is however, in this case, impressed upon a disc member 260 mounted to a shaft 250′. It thus becomes optional to the user as to which type of programming means he desires to select. As shown in FIGURE 3*b* the cooperating sensing brushes of the sensing brush group 216″ make wiping contact with the upper surface of disc 260. In order to better neutralize or balance the coupling moments impressed upon the shaft 250′ in the embodiment of FIGURE 3*b*, it is further possible to place certain portions of the coating configuration upon the underside of disc member 260 and to provide sensing brushes for cooperative engagement with the conductive coatings on the underside of disc 260 so as to neutralize or balance the coupling moments impressed upon disc 260 so that substantially no forces are imposed upon shaft 250′ through disc 260 which cause a slight bending moment to be exerted upon shaft 250′.

It can therefore be seen that the instant invention provides a programming means which keys a transmitter output facility with binary coded data in substantially less time than is required for a read-out of such binary bits in a one-at-a-time fashion and which further generates code frequencies which are easily and readily distinguishable at the receiver end in order to greatly simplify the receiver decoding operation. The substantial decrease in time of the transmission or keying cycle permits use of a programming drum or disc having substantially smaller dimensions allowing its use in extremely confined areas having severe space limitations. Thus, for example, the programming means of the instant invention permits the use of such a drum having a physical size which is substantially less than half the size of the programming means employed in the transmitter facility of copending application Serial No. 227,806 mentioned previously.

Although there has been described a preferred embodiment of this novel invention, many variations and modifications will now be apparent those skilled in the art. Therefore, this invention is to be limited, not by the specific disclosure herein, but only by the appending claims.

The embodiments of the invention in which an exclusive privilege or property is claimed are defined as follows:

1. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the reaminder of the signals of said one group to said second means at a second instant of time occurring after said first instant of time thereby generating at least two output signals representing a character, said output signals being fewer in number than the number of binary signals in each of the groups.

2. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occuring after said first instant of time thereby generating at least two output signals representing a character, said output signals being fewer in number than the number of binary signals in each of the groups, said first means comprising an oscillator circuit.

3. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit thereby generating at least two output signals representing a character, said output signals being fewer in number than the number of binary signals in each of the groups, said second means comprising an adjustable tuned circuit for controlling the frequency of output tones generated by said oscillator circuit.

4. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element.

5. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable drum and at least one group of sensing members adapted to make wiping contact with the surface of said drum; a first and second array of conductive segments being positioned along the surface of said drum.

6. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable drum and at least one group of sensing members adapted to make wiping contact with the surface of said drum; a first and second array of conductive segments being positioned along the surface of said drum, said first array being comprised of a plurality of conductive segments fewer in number than the number of sensing elements of said one group being arranged in a first line substantially parallel to the longitudinal axis of said drum so as to simultaneously engage the associated sensing members at said first instant of time.

7. Transmitter means for use in a communications system employing discrete tones to represent transmitted characters comprising first means for generating tone signals; said first means comprising second means for altering the frequency of said tone singals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable drum and at least one group of sensing members adapted to make wiping contact with the surface of said drum; a first and second array of conductive segments being positioned along the surface of said drum, said first array being comprised of a plurality of conductive segments fewer in number than the number of sensing elements of said one group being arranged in a first line substantially parallel to the longitudinal axis of said drum so as to simultaneously engage the associated sensing members at said first instant of time; said second array being comprised of a plurality of conductive segments fewer in number than the number of said sensing elements of said one group and being arranged in a second line which is positioned at a spaced parallel distance from said first line so as to simultaneously engage the associated sensing members at said second instant of time.

8. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable drum and at least one group of sensing members adapted to make wiping contact with the surface of said drum; a first and second array of conductive segments being positioned along the surface of said drum, said first array being comprised of a plurality of conductive segments fewer in number than the number of sensing elements of said one group being arranged in a first line substantially parallel to the longitudinal axis of said drum so as to simultaneously engage the associated sensing members at said first instant of time; said second array being comprised of a plurality of conductive segments fewer in number than the number of said sensing elements of said one group and being arranged in a second line which is positioned at a spaced parallel distance from said first line so as to simultaneously engage the associated sensing members at said second instant of time; said first array being adapted to make wiping contact with selected ones of the sensing members of said group; said second array being adapted to make wiping contact with the remaining sensing members not wipingly engaged by said first array.

9. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable drum and at least one group of sensing members adapted to make wiping contact with the surface of said drum; a first and second array of conductive segments being positioned along the surface of said drum, said first array being comprised of a plurality of conductive segments fewer in number than the number of sensing elements of said one group being arranged in a first line substantially parallel to the longitudinal axis of said drum so as to simultaneously engage the associated sensing members at said first instant of time; said second array being comprised of a plurality of conductive segments fewer in number than the number of said sensing elements of said one group and being arranged in a second line which is positioned at a spaced parallel distance from said first line so as to simultaneously engage the associated sensing members at said second instant of time; said first array being adapted to make wiping contact with selected ones of the sensing members of said group; said second array being adapted to make wiping contact with the remaining sensing members not wipingly engaged by said first array, said sensing members being adapted to simultaneously receive the binary coded signals representing the characters to be transmitted.

10. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor elements and a plurality of capacitor elements each having a first terminal connected in common with one terminal of said inductor element, said programming means comprising a rotatable drum and at least one group of sensing members adapted to make wiping contact with the surface of said drum; a first and second array of conductive segments being positioned along the surface of said drum, said first array being comprised of a plurality of conductive segments fewer in number than the number of sensing elements of said one group being arranged in a first line substantially parallel to the longitudinal axis of said drum so as to simultaneously engage the associated sensing members at said first instant of time; said second array being comprised of a plurality of conductive segments fewer in number than the number of said sensing elements of said one group and being arranged in a second line which is positioned at a spaced parallel distance from said first line so as to simultaneously engage the associated sensing members at said second instant of time; said first array being adapted to make wiping contact with selected ones of the sensing members of said group; said second array being adapted to make wiping contact with the remaining sensing members not wipingly engaged by said first array, said sensing members being adapted to simultaneously receive the binary coded signals representing the characters to be transmitted; the conductive segments of said first array being electrically connected to the second terminals of selected ones of said capacitor elements to generate a predetermined frequency tone signal at said first time interval.

11. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable drum and at least one group of sensing members adapted to make wiping contact with the surface of said drum; a first and second array of conductive segments being positioned along the surface of said drum, said first array being comprised of a plurality of conductive segments fewer in number than the number of sensing elements of said one group being arranged in a first line substantially parallel to the longitudinal axis of said drum so as to simultaneously engage the associated sensing members at said first instant of time; said second array being comprised of a plurality of conductive segments fewer in number than the number of said sensing elements of said one group and being arranged in a second line which is positioned at a spaced parallel distance from said first line so as to simultaneously engage the associated sensing members at said second instant of time;

said first array being adapted to make wiping contact with selected ones of the sensing members of said group; said second array being adapted to make wiping contact with the remaining sensing members not wipingly engaged by said first array, said sensing members being adapted to simultaneously receive the binary coded signals representing the characters to be transmitted; the conductive segments of said first array being electrically connected to the second terminals of selected ones of said capacitor elements to generate a predetermined frequency tone signal at said first time interval; the conductive segments of said second array being electrically connected to the second terminals of the remaining capacitor elements to generate a predetermined frequency tone signal at said second time interval.

12. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable drum and at least one group of sensing members adapted to make wiping contact with the surface of said drum; a first and second array of conductive segments being positioned along the surface of said drum, said first array being comprised of a plurality of conductive segments fewer in number than the number of sensing elements of said one group being arranged in a first line substantially parallel to the longitudinal axis of said drum so as to simultaneously engage the associated sensing members at said first instant of time; said second array being comprised of a plurality of conductive segments fewer in number than the number of said sensing elements of said one group and being arranged in a second line which is positioned at a spaced parallel distance from said first line so as to simultaneously engage the associated sensing members at said second instant of time; said first array being adapted to make wiping contact with selected ones of the sensing members of said group; said second array being adapted to make wiping contact with the remaining sensing members not wipingly engaged by said first array, said sensing members being adapted to simultaneously receive the binary coded signals representing the characters to be transmitted; the conductive segments of said first array being electrically connected to the second terminals of selected ones of said capacitor elements to generate a predetermined frequency tone signal at said first time interval; the conductive segments of said second array being electrically connected to the second terminals of the remaining capacitor elements to generate a predetermined frequency tone signal at said second time interval, the tones generated during said first and second time intervals being adapted to represent a predetermined character.

13. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element; said programming means comprising a rotatable discs and at least one group of sensing members adapted to make wiping contact with the surface of said disc; a first and second array of conductive segments being positioned along the surface of said disc.

14. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring some of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element; said programming means comprising a rotatable disc and at least one group of sensing members adapted to make wiping contact with the surface of said disc; a first and second array of conductive segments being positioned along the surface of said disc; said sensing members being positioned along a line located radially to said disc.

15. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable disc and at least one group of sensing members adapted to make wiping contact with the surface of said disc; a first and second array of conductive segments being positioned along the surface of said disc, said sensing members being positioned along a line located radially to said disc, said first array being comprised of a plurality of conductive segments fewer in number than the number of sensing elements of said one group being arranged along a first radial line of said disc so as to simultaneously engage the associated sensing members at said first instant of time.

16. Transmitter means for use in a communications system employing discrete tones to represent transmitted characters comprising first means for generating tone signals; said first means comprising second means for alterig the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjutable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable disc and at least one group of sensing members adapted to make wiping contact with the surface of said disc; a first and second array of conductive segments being positioned along the surface of said disc, said sensing members being positioned along a line located radially to said disc, said first array being comprised of a plurality of conductive segments fewer in number than the number of sensing elements of said one group being arranged along a first radial line of said disc so as to simultaneously engage the associated sensing members at said first instant of time; said second array being comprised of a plurality of conductive segments fewer in number than the number of said sensing elements of said one group and being arranged along a second radial line of said disc which is positioned at a spaced distance from said first line so as to simultaneously engage the associated sensing members at said second instant of time.

17. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element; said programming means comprising a rotatable disc and at least one group of sensing members adapted to make wiping contact with the surface of said disc; a first and second array of conductive segments being positioned along the surface of said disc; said sensing members being positioned along a line located radially to said disc, said first array being comprised of a plurality of conductive segments fewer in number than the number of sensing elements of said one group being arranged along a first radial line of said disc so as to simultaneously engage the associated sensing members at said first instant of time; said second array being comprised of a plurality of conductive segments fewer in number than the number of said sensing elements of said one group and being arranged along a second radial line of said disc which is positioned at a spaced distance from said first line so as to simultaneously engage the associated sensing members at said second instant of time; said first array being adapted to make wiping contact with selected ones of the sensing members of said group; said second array being adapted to make wiping contact with the remaining sensing members not wipingly engaged by said first array.

18. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group represent the characters to be transmitted wherein the binary signals of each group are imposed in parallel fashion upon said input means; said programming means further comprising sequencing means for simultaneously transferring some of the signals of one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element; said programming means comprising a rotatable disc and at least one group of sensing members adapted to make wiping contact with the surface of said disc; a first and second array of conductive segments being positioned along the surface of said disc; said sensing members being positioned along a line located radially to said disc, said first array being comprised of a plurality of conductive segments fewer in number than the number of sensing elements of said one group being arranged along a first radial line of said disc so as to simultaneously engage the associated sensing members at said first instant of time; said second array being comprised of a plurality of conductive segments fewer in number than the number of said sensing elements of said one group and being arranged along a second radial line of said disc which is positioned at a spaced distance from said first line so as to simultaneously engage the associated sensing members at said second instant of time; said first array being adapted to make wiping contact with selected ones of the sensing members of said group; said second array being adapted to make wiping contact with the remaining sensing members not wipingly engaged by said first array, said sensing members being adapted to simultaneously receive the binary coded signals representing the characters to be transmitted.

19. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means compising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable disc and at least one group of sensing members adapted to make wiping contact with the surface of said disc; a first and second array of conductive segments being positioned along the surface of said disc, said sensing members being positioned along a line located radially to said disc, said first array being comprised of a plurality of conductive segments fewer in number than the number of sensing elements of said one group being arranged along a first radial line of said disc so as to simultaneously engage the associated sensing members at said first instant of time; said second array being comprised of a plurality of conductive segments fewer in number than the number of said sensing elements of said one group and being arranged along a second radial line of said disc which is positioned at a spaced distance from said first line so as to simultaneously engage the associated sensing members at said second instant of time; said first array being adapted to make wiping contact with selected ones of the sensing members of said group; said second array being adapted to make wiping contact with the remaining sensing members not wipingly engaged by said first array, said sensing members being adapted to simultaneously receive the binary coded signals representing the characters to be transmitted; the conductive segments of said first array being electrically connected to the second terminals of selected ones of said capacitor elements to generate a predetermined frequency tone signal at said first time interval.

20. Transmitter means for use in a communictions system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group representing a character to be transmitted wherein the binary signals of each group are imposed in parallel fashion upon said input means; said programming means further comprising sequencing means for simultaneously transferring some of the signals of one group to said second means at a first instant of time; and for simultaneously transferring the remainder of the signals of said one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element, said programming means comprising a rotatable disc and at least one group of sensing members adapted to make wiping contact with the surface of said disc; a first and second array of conductive segments being positioned along the surface of said disc, said sensing members being positioned along a line located radially to said disc, said first array being comprised of a plurality of conductive segments fewer in number than the number of sensing elements of said one group being arranged along a first radial line of said disc so as to simultaneously engage the associated sensing members at said first instant of time; said second array being comprised of a plurality of conductive segments fewer in number than the number of said sening elements of said one group and being arranged along a second radial line of said disc which is positioned at a spaced distance from said first line so as to simultaneously engage the associated sensing members at said second instant of time; said first array being adapted to make wiping contact with selected ones of the sensing members of said group; said second array being adapted to make wiping contact with the remaining sensing members not wipingly engaged by said first array, said sensing members being adapted to simultaneously receive the binary coded signals representing the characters to be transmitted; the conductive segments of said first array being electrically connected to the second terminals of selected ones of said capacitor elements to generate a predetermined frequency tone signal at said first time interval; the conductive segments of said second array being electrically connected to the second terminals of the remaining capacitor elements to generate a predetermined frequency tone signal at said second time interval.

21. Transmitter means for use in a communications system employing discrete tones to represent transmitted characters comprising first means for generating tone signals; said first means comprising second means for altering the frequency of said tone signals; third means for receiving data in the form of characters to be transmitted for controlling said second means to cause said first means to generate tones of discrete frequencies; said third means including programming means for operating said second means through a predetermined sequence responsive to each character received by said programming means; said programming means comprising input means for sequentially receiving a plurality of binary coded signals arranged in groups, each group represent the characters to be transmitted wherein the binary signals of each group are imposed in parallel fashion upon said input means; said programming means further comprising sequencing means for simultaneously transferring some of the signals of one group to said second means at a second instant of time occurring after said first instant of time, said first means comprising an oscillator circuit, said second means comprising an adjustable tuned circuit for controlling the frequency of output tones generated by said oscillator circuit; said tuned circuit comprising an inductor element and a plurality of capacitor elements each having a first terminal connected in common with one terminal of said inductor element; said programming means comprising a rotatable disc and at least one group of sensing members adapted to make wiping contact with the surface of said disc; a first and second array of conductive segments being positioned along the surface of said disc; said sensing members being positioned along a line located radially relative to said disc, said first array being comprised of a plurality of conductive segments fewer in number than the number of sensing elements of said one group being arranged along a first radial line of said disc so as to simultaneously engage the associated sensing members at said first instant of time; said second array being comprised of a plurality of conductive segments fewer in number than the number of said sensing elements of said one group and being arranged along a second radial line of said disc which is positioned at a spaced distance from said first line so as to simultaneously engage the associated sensing members at said second instant of time; said first array being adapted to make wiping contact with selected ones of the sensing members of said group; said second array being adapted to make wiping contact with the remaining sensing members not wipingly engaged by said first array, said sensing members being adapted to simultaneously receive the binary coded signals representing the characters to be transmitted; the conductive segments of said first array being electrically connected to the second terminals of selected ones of said capacitor elements to generate a predetermined frequency tone signal at said first time interval; the conductive segments of said second array being electrically connected to the second terminals of the remaining capacitor elements to generate a predetermined frequency tone signal at said second time interval, the tones generated during said first and second time intervals being adapted to represent a predetermined character.

References Cited by the Examiner

UNITED STATES PATENTS

| | | | |
|---|---|---|---|
| 3,030,614 | 4/1962 | Lehan et al. | 340—347 |
| 3,068,463 | 12/1962 | Goldman | 340—347 |

MALCOLM A. MORRISON, *Primary Examiner.*